United States Patent [19]
Adams

[11] Patent Number: 5,511,123
[45] Date of Patent: Apr. 23, 1996

[54] SYMMETRIC CRYPTOGRAPHIC SYSTEM FOR DATA ENCRYPTION

[75] Inventor: Carlisle M. Adams, Ottawa, Canada

[73] Assignee: Northern Telecom Limited, Montreal, Canada

[21] Appl. No.: 285,678

[22] Filed: Aug. 4, 1994

[51] Int. Cl.$^6$ .................................................. H04L 9/06
[52] U.S. Cl. ............................................................ 380/29
[58] Field of Search ................................................ 380/29

[56] References Cited

U.S. PATENT DOCUMENTS 5,003,597  3/1991  Merkle ................................ 380/29 X
5,351,299  9/1994  Matsuzaki et al. ................. 380/29 X

OTHER PUBLICATIONS

"Differential Cryptanalysis of the Full 16-round DES", E. Biham and A. Shamir, Advances in Cryptology, Proceedings of CRYPTO '92, Springer–Verlag, pp. 487–496.
"On immunity against Biham and Shamir's differential cryptanalysis", C. M. Adams, Information Processing Letters, vol. 41, Feb. 14, 1992, pp. 77–80.
"Designing S–Boxes for Ciphers Resistant to Differential Cryptanalysis (Extended Abstract)", C. M. Adams and S. E. Tavares, Proceedings of the 3rd Symposium on State and Progress of Research in Cryptography, Rome, Italy, Feb. 15–16, 1993, pp. 181–190.
"Linear Cryptanalysis Method for DES Cipher", M. Matsui, Advances in Cryptography: Proceedings of EUROCRYPT '93, Springer–Verlag, pp. 386–397.

*Primary Examiner*—Gilberto Barrón, Jr.
*Attorney, Agent, or Firm*—Yoshiharu Toyooka

[57] ABSTRACT

A novel symmetric cryptographic system for data encryption using novel partially bent-function-based (m×n) substitution boxes (s-boxes), where m and n are positive even numbers, $m<<n$ and $m<\log \binom{n}{n/2}$ is disclosed. A novel key schedule is used for selecting internal keys which also undergo substitution transformation by s-boxes. The s-boxes are designed on the principle that bent-function-based s-boxes possess good characteristics for encryption. The s-boxes of the invention are represented by (m×n) binary matrices.

16 Claims, 7 Drawing Sheets

Fig 6    s-box S1

```
0ec9fcc9  241be718  1ad5fceb  45e184fe  ae7de898  99793353  46d927d1  a504b915
efc9bcc8  be343ca7  ceee5bd8  ac360fb8  a98d33b2  110ee6e4  857a2dcd  afe30a5f
0ec5fc99  ac750137  0f7c8e45  721a63ce  c77e3d8b  739e23da  a8a9f609  62a0deb6
6585b498  51ab5342  3513a346  9828e372  571cc877  81ca5971  988c50f3  767040d0
0e419cc8  0a42fcc0  6803d9af  bba1bc40  9eccb4c8  05153a79  3794a039  dad30da4
7b41dcc9  7f49d8da  d77a2662  42109054  a013ab0e  cf69d487  325a3637  6d7ddd59
0e4d9c98  cb4aeaec  4c4d1c81  f4db1cf3  0eef1e24  5fb4a50c  1123b99e  9cd6527b
0ecddc99  26704f3c  e2a0617c  f14f3314  58622734  102becee  18ab8b76  ca8fafaa
3665755a  9ca738eb  647d7578  7b5d0d69  96c4610b  61d5aec0  7b71bc42  58ac24a6
5765355b  479db110  f752c24b  168ad04f  d533ea05  29a01f37  bbd6a47e  d74ba58c
3669750a  97db8ac4  36c07596  4aa6fe39  bec7b41c  4936880d  9505599a  de0e7365
5f293d0b  28068ab5  0aad0ad5  e4946ae5  2bb247a4  bb66c0c6  2422f960  4ccecb03
36ed155b  36ea2513  17af743c  85093597  e6713f5b  bfbd93ca  0a3c2faa  a07f9057
c7ed555a  42f05740  ebc29bf1  b8bc4bea  9ca970b9  f1c71d74  0cf6ab84  d6d576ca
36e1150b  70f06737  74f5c352  c8738144  335295b3  27183afb  288f020d  a77cffe8
30615505a 9fcd94eb  d81aecef  c9e3bec3  60c8aae7  2c874579  a00536e5  33312839
71ce86b6  730c5a4f  73de8796  0416f695  e16e12e4  ee5e4cb4  155adea6  de4fc7ca
90cec6b7  f1774be4  b9f1a8a4  f1a13363  cada89fa  6ea1f48b  ec5d5e00  d0e0df23
71c286e6  d9f2f1f8  70a396b8  0d6d9c9d  906dc6e2  2e3d7b30  eb8e2266  310f0849
10c2c6e7  0eac6098  7c2c7923  eb5f1909  3c9b3518  fca52b20  d36b0a8d  2b673826
7146e6b7  7141c6b7  114c86d0  fae2462b  f1db45a6  7036e12e  7c37ddcf  a75c737a
3006a6b6  041a2439  8c61711c  0f37a806  c3009a54  bec6eed8  6b1dc17b  10be04a4
7114ae6e7 96d99d03  23d6207e  8f186ba0  7df8ee5f  00135956  4e24e970  c9bd8485
4fcaaee6  4967f746  879b1f1b  9688cdef  37a15149  6344b68f  672c5589  9558d3dd
b69df0da  344f7a43  f289f1fa  c55580fd  26286488  e90d2ed8  d70dbaca  dc18a586
d79db0db  f72139ac  7fb2cec8  b4e2136b  499bafb2  a9f0f2a7  2d0e284c  57b78f0f
b691f08a  1da385f4  b6e09294  ca2efe95  162bb08a  eb6a2f18  29dd720a  725e5a65
d591b08b  88fe4690  bc6d2f4f  681c6f61  bfca4534  39f64d68  903a5ce1  ee264c0a
b6159c0db b216e09b  911fd4bc  3bb53003  769931ca  3561b762  be60ada3  220f1176
7355d0da  c65c5451  4f263370  0a648c4e  0045be1c  7f97d8d4  aa4ea337  54e950c8
b619908b  d29cef2f  e4910052  4c4f09e8  bfba9a37  8740395e  8877ad1c  0de8d6e9
8e99d88a  0f25d36e  42de6d77  51dbbfc7  f0f42365  a017e0e7  207d17e5  9319a3b1
```

Fig 7    s-box S2

```
b7128d27  b4030c85  9f47bc37  69428a8a  b7228187  81f12921  8bca8527  353680da
d792cd26  92d327db  a6baec41  2f26f36b  db1716ea  3b4c9e29  dc114976  8dac2e26
b71e8d77  11f066b6  6001c972  48837021  f7162f7a  4adf72bc  b47a2699  fae43389
965ecd76  89a0da09  51aa32a9  f9f1358c  19e82acd  8de9c08f  28fcd3bf  766333e3
b79aed26  3799b136  b33a770e  d3102bb6  a78cad66  d8f8c71e  44368df5  a650fd61
549aa527  c6d43bec  1fd5d89f  547b0434  ed63da58  108239c1  23a55610  7a9fedad
b796ed76  5fa29d7a  bfb46bb4  ccd1fe9d  17bdfc64  2e1b2503  784bb84b  a7879e4d
ea96ad77  efaf8841  e4cd6788  436ce553  20591180  642ad6e7  2b4552d9  b0952817
b915c92c  3a12b88c  9174c83c  47514e8b  9905958c  cff42d22  a5f9a1a8  bb23d451
5995892d  dcc603d2  c89f784c  21357764  d500d2e3  754ffaa2  3226bd7f  e3992aa9
b919c97c  5fe1b23d  ae024d79  4686b4a6  3901eb75  04fa66b9  da4dc210  f4c3f702
f859897d  c7a7fe02  5fbfc6a2  57e64183  37db3ec6  23ccd484  06db77b0  386257ec
b99da92d  b99c2535  fd099305  fd05efb5  a9bfa96d  d6dfa31d  4a11697e  2875a9e6
da9de12c  88d57fef  31e0dc92  5a7ec039  c3600e51  1ea37d4a  ed96621d  148aa92e
b991a97d  11a769fb  31b77fbf  c2d23a18  f9be286b  201c5106  36689cc6  a9905aca
8491e97c  a1bccc40  aac80383  ed6dd15e  2e7e158b  8a2de2ec  256636d2  feb40c14
e00c7212  e04d2a90  c8685232  3604f5bf  f01c2e92  d5ee9604  db6432f2  78786341f
810c3a13  dc5595ee  e104c565  6f69cb5e  8ed061cf  669264fd  95b72743  d6029593
e0007242  4e3e0723  2096f446  1fd505b4  a018525e  1be9dfb9  e6d45360  b49b4c3d
dd003243  ddfe687d  16255a9c  aabfdaf8  5f4f87f8  dad66f9b  6a43edaa  2b7dc9b7
e0841213  62869803  f4950308  a1654842  e0a31373  8c473830  0908fa00  e1ae1af5
00845212  8303c6f9  427b6bbb  10647c00  ba35bc7d  47fcc315  7d03f805  29911219
e0881243  013df3cf  efa3cc80  9dc78b09  40a29040  7f8dc806  37750d9f  e348e5f8
a3485242  b0a07515  b95295bd  14724a26  646fadb5  39b579f3  7efaacec  e52b9642
11f4c9e6  91a36166  39a4d9c6  e7e8ce41  21c4c566  64146df8  0aa8e982  0992c83b
f0f481e7  6dbf4e18  70deae97  9e85b0ae  7f385a39  d76eff89  847f2cb5  47c86ee3
11f8c9b6  ffd02c57  116a8fb2  ee2f3ecc  91f069ae  aa333443  771c481b  45437749
4cf889b7  6c06b389  e7cf5168  fb575108  8e836c0c  8b0c846f  bb9bb65a  9a835247
117ca9e7  137cf3ff  4559187f  116fe887  7d9fa3c7  f8d0e174  9074b18d
717ce9e6  32fd7d05  93b19049  e19e47f2  6bc9978b  b6227861  4ccf33f7  b87ba965
1170a9b7  b0c7f8b1  9e5f2774  6c3bb073  515ebbb0  8e7543fc  86a9d6ed  12a0de80
32b0e9b6  014cceeb  08a80e49  458c81d4  95b75641  284db207  8f263718  54f54dbe
```

SYMMETRIC CRYPTOGRAPHIC SYSTEM FOR DATA ENCRYPTION

FIELD OF THE INVENTION

The present invention is directed to a cryptographic system to be used in digital data processing. In particular, it is directed to the cryptographic system which includes a symmetric data encryption technique employing partially bent-function-based substitution boxes.

BACKGROUND OF THE INVENTION

The basic function provided by a cryptographic system (or cryptosystem) is encipherment/decipherment. A cryptosystem can be considered to consist of a pair of data transformations—the first transformation is applied to a data item, known as plaintext, and generates a new (unintelligible) data item called ciphertext. The other transformation, applied to ciphertext, results in the regeneration of the original plaintext. An encipherment transformation uses as input both the plaintext data and an independent data value known as an encipherment key. Similarly, a decipherment transformation uses a decipherment key. These keys are seemingly random bit-vectors. There are two basic types of cryptosystems—symmetric systems and public-key (or asymmetric) systems. The DES (U.S. Data Encryption Standard) is a symmetric cryptosystem in which the same key is used in the encipherment and decipherment transformation.

FIGS. 1 and 2 are algorithmic flow charts of the DES enciphering process. The DES algorithm employs a 56-bit key and operates on 64-bit blocks of data. Referring to FIG. 1, the encipherment process begins at an initial permutation 10 of a block of 64 bits of plaintext which is then divided into two 32-bit halves. One half (e.g. Right half $R_1$ at the first round) is used as input to a key-dependent round function 12 (e.g. $f_1$) which takes internal key $K_1$ as a second input, and the result (e.g. $R'_1$) is exclusive-ORed (XORed or summed modulo 2) 14 to the other half (e.g. Left half $L_1$). After one such iteration, or round, the two halves of the data are swapped and the operation is performed again. After 16 rounds of computation, the output is put through a final permutation 16 to generate the ciphertext which is 64 bits long. The round function includes passes through eight nonlinear substitutions known as s-boxes and will be described in more detail in FIG. 2, in which the round function $f_i$ of the i-th round (i=1, 2, ..., 16) is shown. The function takes two inputs, the right half $R_i$ of the block and an internal key $K_i$, and generates an output $R'_i$. The initial key is 56 bits long from which 48 bits are selected at each round according to a predetermined key schedule 20 to generate the internal key $K_i$. The right half $R_i$ is first expanded at 22 from 32 bits to 48 bits and XORed 24 with the internal key $K_i$. The result is divided into eight parts and is applied to eight different s-boxes 26. The s-boxes are nonlinear substitutions, mapping 6 input bits into 4 output bits. The eight outputs of the s-boxes are concatenated at 28 and then permuted at 30 to yield an output $R'_i$ 32 which will be XORed with the left half $L_i$ as shown in FIG. 1.

The decipherment process is of the same form as the encipherment process, except that the internal keys for the 16 rounds are in reverse order e.g. $K_{16}, K_{15}, \ldots K_2$ and $K_1$.

The ciphertext displays no correlation to the plaintext. Every bit of the output depends upon every bit of the input and on every bit of the key. The security of DES depends primarily upon the non-linear s-boxes, since the remaining parts of the algorithm are all linear and thus easily attacked. It does not, however, depend on the secrecy of the algorithm, since the complete algorithm, including the contents of the s-boxes, is public knowledge.

The strength of DES has been a controversial issue and many attacks have been debated. In an article entitled "Differential Cryptanalysis of the Full 16-round DES" in Advances in Cryptology, Proceedings of CRYPTO '92, Springer-Verlag, pp 487–496, E. Biham and A. Shamir describe a cryptanalytic attack that can break DES using $2^{47}$ chosen plaintexts. Their differential cryptanalysis is based on the principle that when the XOR of two plaintexts is equal to a specific value, it is possible to perform a statistical attack on the key given the two plaintexts and their corresponding ciphertexts. The statistical attack is possible because the s-boxes, while nonlinear, generate a highly skewed distribution of XOR outputs for given XOR inputs. For example, S1 maps the XOR input of "30" hexadecimal to an XOR output of "4" with probability ¼. Since the output of an s-box is 4-bits, an even distribution would map each input XOR into each output XOR with probability 1/16.

The relationship between s-box construction and immunity against Biham and Shamir's differential cryptanalysis of DES-like cryptosystems was discussed in the present inventor's article entitled "On immunity against Biham and Shamir's differential cryptanalysis", Information Processing Letters, vol. 41, Feb. 14, 1992, pp. 77–80. It was proporsed in the article that s-boxes with an even distribution of so-called "Output XORs" would be immune to this attack and it was proven that bent-function-based s-boxes are guaranteed to possess this flat distribution.

While it is known that a flat Output XOR distribution avoids differential cryptanalysis because it does not produce high-probability (highly skewed) Output XORs and bent-function-based s-boxes have the ideal Output XOR distribution, it is also known that such bent-function-based (m×n) s-boxes only exist for m≧2n where m and n are the numbers of input and output bits, respectively, of the s-box. Any s-box with m>n has more input vectors than output vectors and this indicates that there will be at least one case where two or more inputs are mapped to the same output, that is to say, one or more Input XORs have an Output XOR of zero. Therefore bent-function-based s-boxes for m>n have a fixed, non-negligible probability of occurrence of Output XORs which may be exploited in cryptanalysis.

In Proceedings of the 3rd Symposium on State and Progress of Research in Cryptography, Rome, Italy on Feb. 15–16, 1993, the present inventor, together with a co-author, describes s-box design in an article entitled "Designing S-boxes for Ciphers Resistant to Differential Cryptanalysis (Extended Abstract)", pp. 181–190. It is concluded in the article, based on the observation above, that s-boxes which have fewer input bits than output bits and which are partially bent-function-based may be a good basis for symmetric cryptosystems.

The paper entitled "Linear Cryptanalysis Method for DES Cipher" by M. Matsui in Advances in Cryptography: Proceedings of EUROCRYPT 93, Springer-Verlag, pp. 386–397, describes another attack on DES-like ciphers. However, where differential cryptanalysis requires $2^{47}$ chosen plaintexts, linear cryptanalysis (which relies on the construction of statistically useful linear approximations of the s-boxes in the round function) requires $2^{47}$ known plaintexts.

In a Workshop on Selected Areas in Cryptography (SAC '94) May 5 and 6, 1994 at Queen's University, Kingston, Ontario, Canada, the present inventor presented a paper entitled "Simple and Effective Key Scheduling for Symmetric Ciphers (Extended Abstract)". The paper describes substantially the basic concept of the present invention.

OBJECTS OF THE INVENTION

It is therefore an object of the invention to provide a cryptographic system which is immune to differential and linear cryptanalysis.

It is another object of the invention to provide a cryptographic system which employs partially bent-function-based (m×n) s-boxes where m<<n and $$m < \log \binom{n}{n/2}.$$

It is a further object of the invention to provide a novel internal key scheduling mechanism which generates no weak or semi-weak encryption keys.

It is yet another object of the invention to provide a novel procedure for designing partially bent-function-based s-boxes.

SUMMARY OF THE INVENTION

Briefly stated, according to one aspect of the invention, a data encryption method of cryptographically transforming plaintext into ciphertext in data blocks of a predetermined bitlength comprises a plurality of consecutive transformation rounds of half of each data block. Each of the consecutive transformation rounds comprises steps of selecting an internal key of a specific bit combination from key bits and processing the internal key by a (m×n) substitution box to generate a modified internal key, where m and n are positive even integers, m<<n, and $$m < \log \binom{n}{n/2}.$$

The transformation round further includes steps of XORing half of each data block with the modified internal key to generate a first modified half data block, and processing the first modified half data block by a plurality of (m×n) mutually different substitution boxes to generate a second modified half data block. The transformation round further includes a step of XORing the second modified half data block with the remaining half of the data block to generate a transformed half data block of a transformation round.

According to another aspect of the invention, a data encryption system cryptographically transforms plaintext into ciphertext in data blocks of a predetermined bitlength by performing a plurality of consecutive transformation rounds of half of each data block. The system comprises a plurality of partially bent-function-based (m×n) s-boxes where m and n are positive even integers, m<<n, and $$m < \log \binom{n}{n/2},$$

each (m×n) s-box being a $2^m \times n$ binary matrix which contains n binary bent vectors of length $2^m$ and at least one non-zero linear combination of the vectors which is not bent. The system further comprises a key processor for processing an internal key by at least one of the s-boxes to generate a modified internal key, a data processor for processing each half data block by at least one of the s-boxes, and an XOR gate for XORing the modified internal key and the processed half data block to generate a transformed half data block of the transformation round.

BRIEF DESCRIPTION OF THE DRAWINGS

For a more complete understanding of the invention and for further objects and advantages thereof, reference may now be made to the following description, taken in conjunction with the accompanying drawings, in which:

FIGS. 6 and 7 are example s-boxes designed according to the invention.

DETAILED DESCRIPTION OF THE PREFERRED EMBODIMENTS OF THE INVENTION

Figure 1:
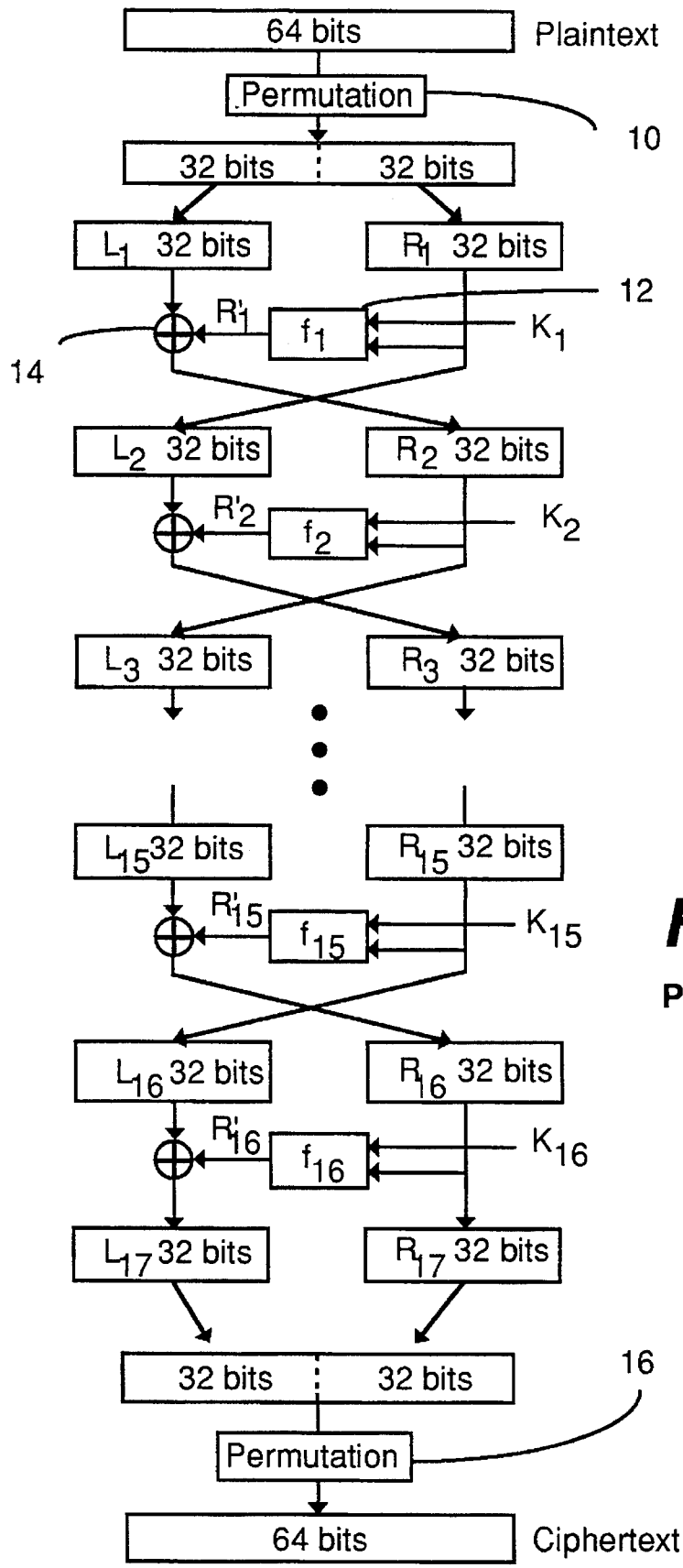
FIG. 1 is an algorithmic flow chart of the known DES encryption process.
Figure 2:
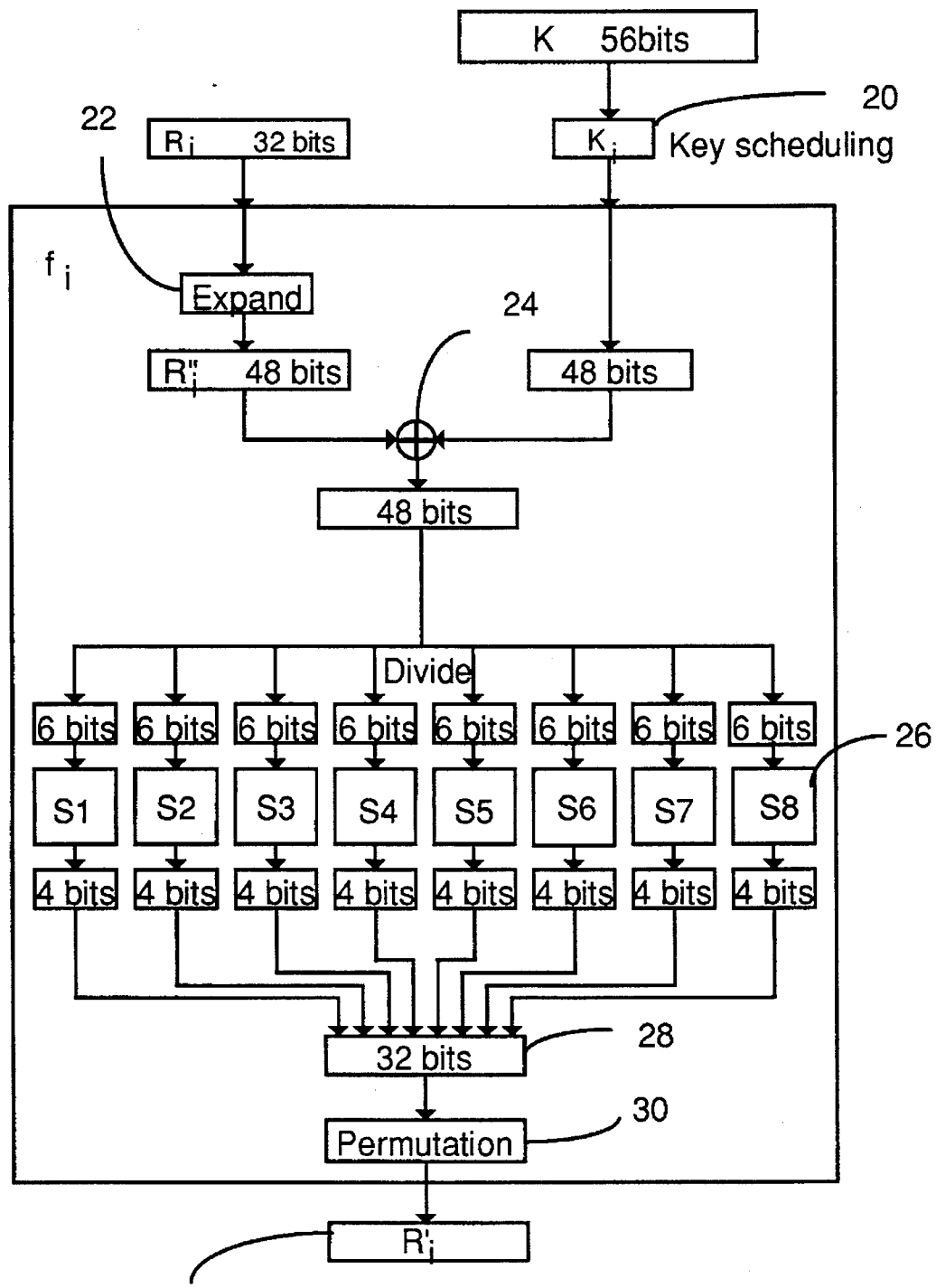
FIG. 2 is a detailed algorithmic illustration of a round function of DES.
Figure 3:
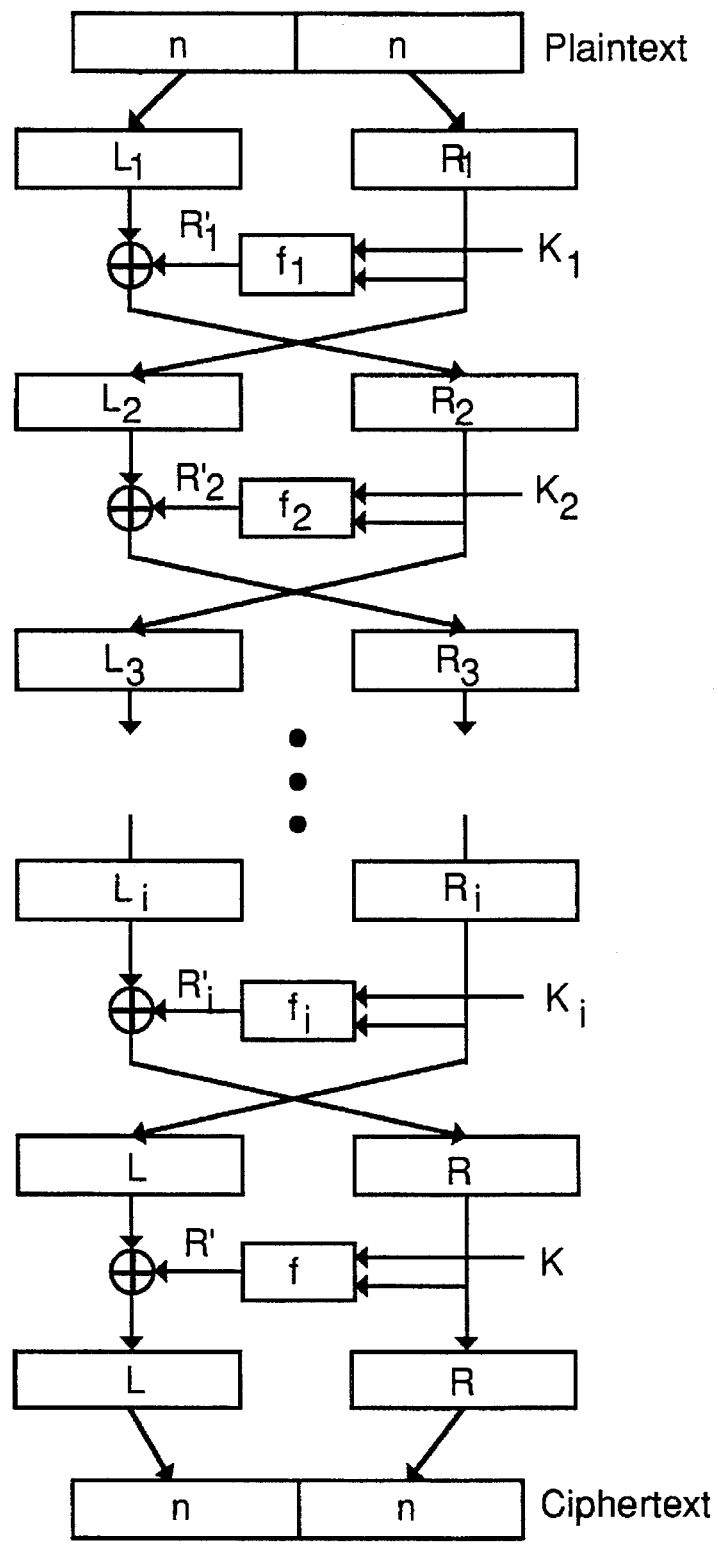
FIG. 3 is an algorithmic flow chart of the encryption process of the invention.

The present invention uses (m×n) s-boxes (m<<n and $$m < \log \binom{n}{n/2})$$

which are partially bent-function-based, thus producing very even distribution of Output XORs, while still satisfying other desirable properties for encryption. FIG. 3 shows the overall structure of the invention. The algorithmic structure is similar to DES. The data blocksize is set at 2n and n=r*m where r is an integer greater than 1. One data block of plaintext is initially broken into halves of length n. At each round, one half is modified, is added modulo 2 to the other half, and the two halves are interchanged. After R rounds the two halves are concatenated to form the ciphertext. Unlike DES, there are no permutation layers. As well, the modification (round function) of a half data block at each round is implemented completely differently from DES. In the invention, the round function contains r+s (m×n) partially bent-function-based s-boxes (s being an integer greater than 1) from separate compatibility classes. The internal key $K_i$ for round i is broken into s m-bit pieces. Each of the s pieces of the internal key is input to each of s separate (m×n) s-boxes and the n-bit outputs are XORed to form the n-bit modified internal key. The n-bit modified internal key is XORed with the half data block $R_i$ to generate an n-bit first modified half data block, which is then broken into r m-bit pieces. Each of the r m-bit pieces is input to each of r separate (m×n) s-boxes and all the n-bit outputs of the r s-boxes are XORed to produce an n-bit second modified half data block $R'_i$. The second modified half data block is then XORed with the remaining half of the data block to generate a transformed half data block of the round.

Figure 4:
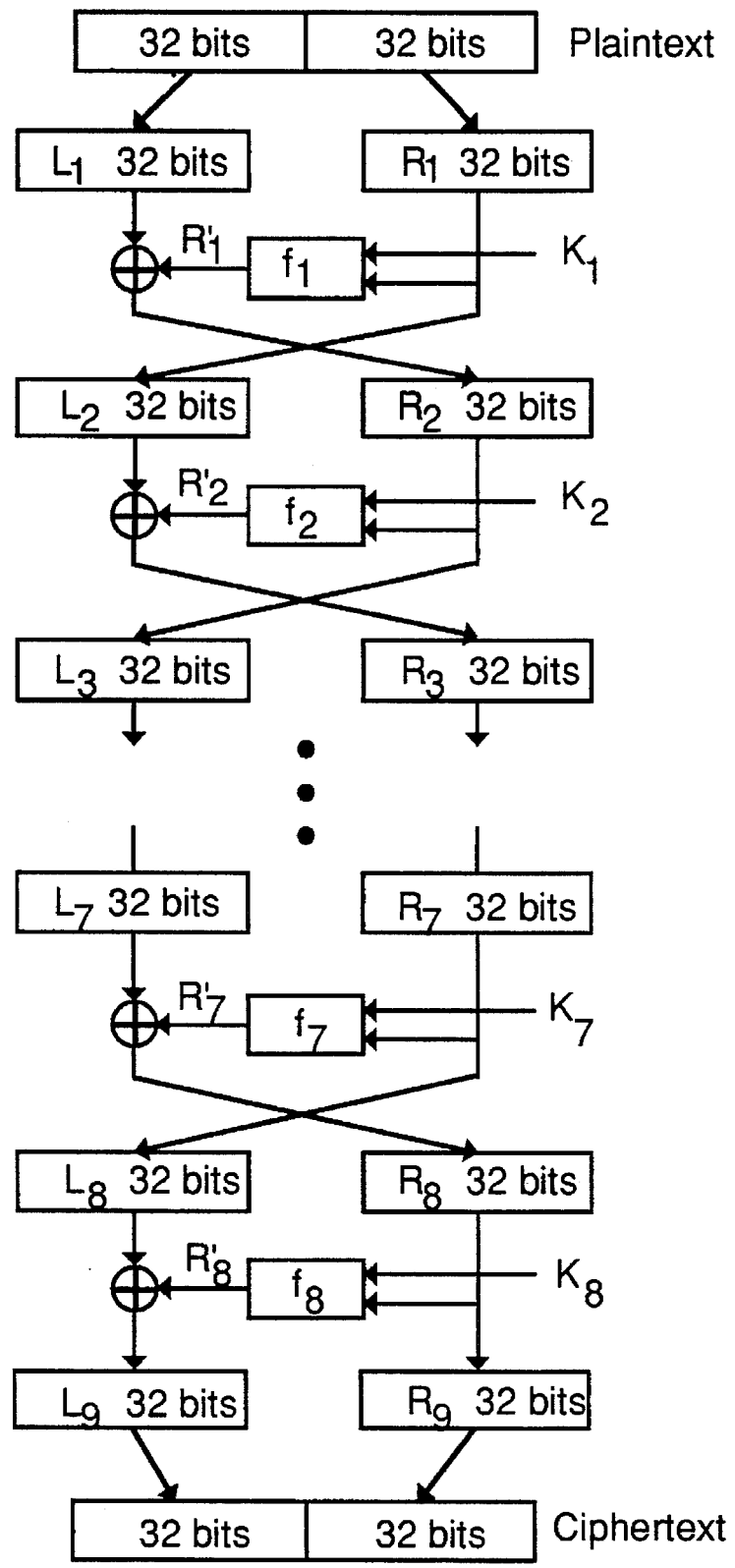
FIG. 4 is an algorithmic flow chart of the encryption process of one embodiment of the invention.
Figure 5:
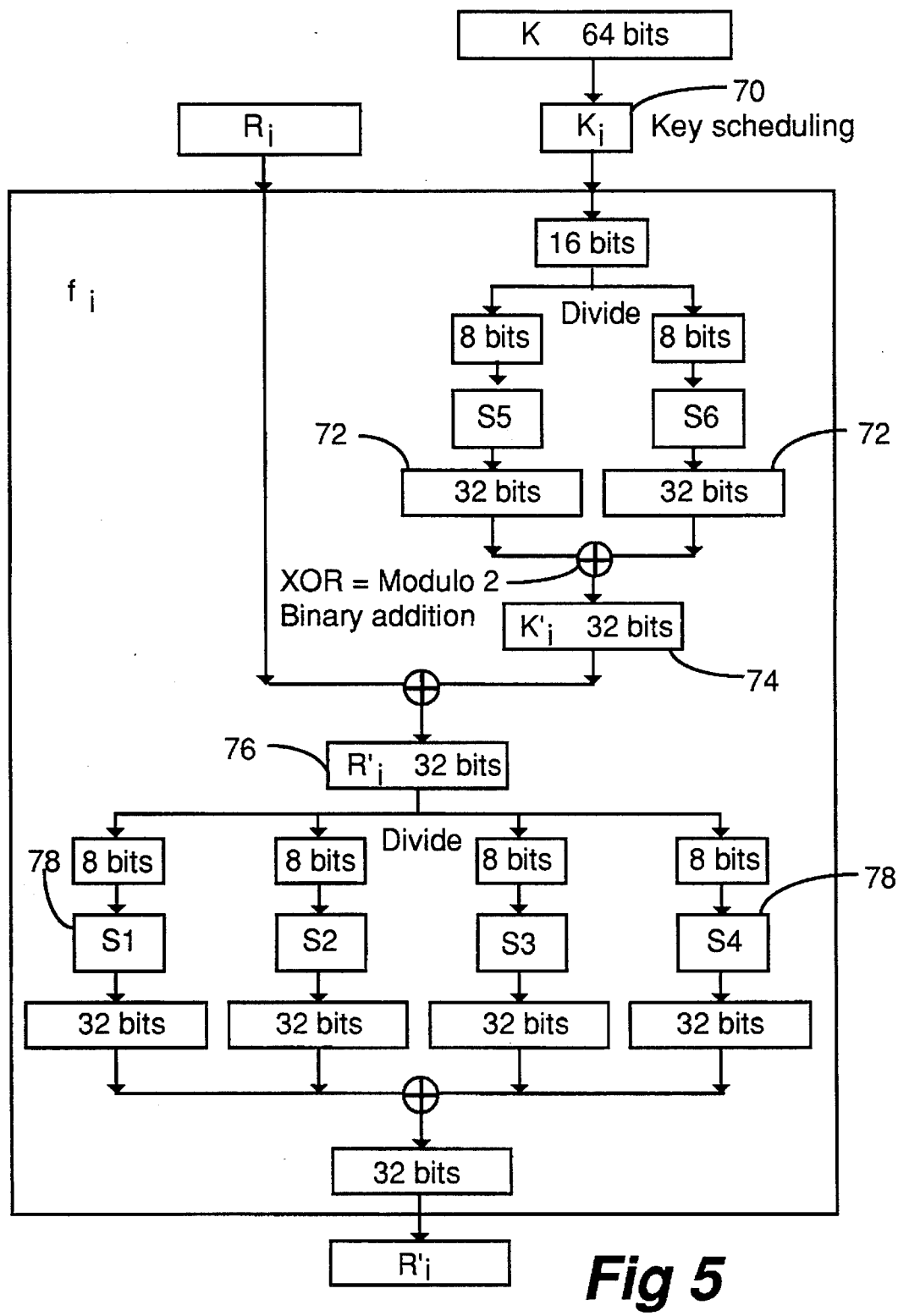
FIG. 5 is a detailed algorithmic illustration of a round function of one embodiment of the invention.

FIGS. 4 and 5 illustrate the algorithmic flow charts of the encryption process according to one embodiment of the invention in which m=8, n=32, r=4, and s=2. Referring specifically to FIG. 4, it is shown that a 64-bit block of plaintext is divided into two 32-bit halves, $L_1$ (left) and $R_1$ (right). At the first round, $R_1$ is modified by using an internal key $K_1$ at round function $f_1$. The key scheduling to generate a specific internal key for each round will be described in detail below. The output of $f_1$ is $R'_i$, which is added modulo 2 to the left half data block $L_1$ to derive a transformed half data block. The transformed half data block is now used for an input $R_2$ for the second round. $R_1$ is used directly for the left half data block $L_2$ for the second round. The same process is repeated for 8 rounds to generate $L_9$ and $R_9$ which are concatenated to form the ciphertext.

FIG. 5 shows in detail one embodiment of the round function $f_i$ for round i, using the same parameters as those in FIG. 4. According to this embodiment, by using a specific key scheduling mechanism 70, internal key $K_i$ with a length of 16 bits is selected from the 64-bit key K. The 16 bits are divided into two 8-bit halves. The first byte goes through an 8×32 s-box (S5) and the second byte through s-box (S6), both designated by numeral 72. The outputs of S5 and S6 are XORed to generate a modified internal key $K'_i$ 74, which is 32 bits long. The half data block $R_i$ and the modified internal key $K'_i$ are XORed to produce a first modified half data block $R''_i$ 76, 32 bits in length, which is divided into four pieces and put through four 8×32 s-boxes 78, e.g. S1, S2, S3, and S4. The outputs of these four s-boxes are again XORed to produce a second modified half data block $R'_i$, 32 bits long. Thus the round function $f_i$ at round i can be defined as:

$$R'_i = f_i(R_i, K_i) = \Sigma Sj[R''_{i,j}]$$

where $R''_i = R_i \oplus S5[K_{i,1}] \oplus S6[K_{i,2}]$.

$R''_{i,j}$ is the j-th byte of $R''_i$ and the summation is from j=1 to 4. $S1[R''_{i,1}]$, $S2[R''_{i,2}]$, ... and $S6[K_{i,2}]$ represent, respectively, a transformation of the 1st byte of $R''_i$ by s-box S1, a transformation of the 2nd byte of $R''_i$ by s-box S2, ... and a transformation of the 2nd byte of internal key $K_i$ by s-box S6.

It should be noted that although each s-box necessarily causes data expansion (since m<n), using the set of s-boxes in this way results in no expansion of the half data block and so the encryption system has input and output blocksizes which are equal (an important consideration in some applications).

A) Design of (m×n) s-boxes where m<<n

As mentioned earlier, the security of a DES-like cryptosystem rests primarily in its s-boxes. In practice, however, their design is often ad hoc or classified. According to the invention, good s-boxes can be designed in a relatively straightforward fashion, as will be described below. An (m×n) s-box is represented as a $2^m \times n$ binary matrix M where each column is a binary vector which corresponds to a Boolean function of the m input variables and which defines the response of a single output bit to any given input. Row i of M, $1 < i < 2^m$, is therefore the n-bit output vector which results from the ith input vector. A binary vector is bent if the normalized resultant vector of a two-dimensional Walsh-Hadamard transform of the vector has all its coefficients either +1 or −1. The Walsh-Hadamard transform is a binary analog of the Fourier transform. It should be noted that binary bent vectors are sufficiently defined above, and no further description of them is believed to be necessary except to note that a very large number of such vectors are known and are readily available for use in the present invention.

As stated earlier, bent-function-based (m×n) s-boxes only exist for m≧2n. The invention uses the s-box design to construct (m×n) s-boxes which are partially bent-function-based, where m<n and $$m < \log\binom{n}{n/2},$$

where $$\binom{n}{n/2}$$

is "n choose n/2". An s-box is defined to be partially bent-function-based if the columns of the binary matrix M representing an s-box are bent, but at least one of the non-zero linear combinations of these columns (summed modulo 2) is not bent. Such partially bent-function-based s boxes are constructed as follows, where m, n, and r are as defined earlier:

(a) From known binary vectors, choose n binary bent vectors $\phi_i$ (i=1, 2, ..., n) of length $2^m$ such that linear combinations of these vectors sum (modulo 2) to highly nonlinear vectors (a highly nonlinear vector is a vector which has a large Hamming distance from a linear vector).

(b) Choose half of the $\phi_i$ to be of Hamming weight $(2^{m-1} + 2^{(m/2)-1})$ and the other half to be of weight $(2^{m-1} - 2^{(m/2)-1})$; these are the two weights possible for binary bent vectors of length $2^m$. It should be stated that the Hamming weight is the number of 1s in a binary vector and the Hamming distance between two or more binary vectors is the Hamming weight of the result of XORing these vectors.

(c) Set the n $\phi_i$ to be the columns of the matrix M representing the s-box.

(d) Check that M has $2^m$ distinct rows and that the Hamming weight of each row and the Hamming distance between pairs of rows is close to n/2 (i.e., that the set of weights and the set of distances each has a mean of n/2 and some suitably small, but non-zero, variance).

(e) If these conditions are not satisfied, continue choosing suitable bent vectors (i.e., candidate $\phi_i$) and checking the resulting matrix until the conditions are satisfied.

According to a further embodiment, partially bent-function-based 8×32 s-boxes can be more easily designed in a more structured process as follows:

(a') Choose the first binary bent vector of length $2^8$ from a pool of known binary bent vectors.

(b') Choose the second bent vector of the same length and measure the Hamming distance between the first and second. If the distance is over a preset desired threshold, retain the second bent vector.

(c') Choose the third bent vector of the same length and measure all possible Hamming distances among the first, second and third vectors. If all the distances are over the threshold, retain the third bent vector.

(d') Continue the above process with fourth, fifth, etc., bent vectors until 32 bent vectors are selected (at each step, checking that all possible Hamming distances are over the threshold).

(e') Set the 32 selected vectors to be the columns of M.

(f') XOR the columns of M with appropriate binary linear vectors as necessary to satisfy steps (b) and (d) above. The resultant matrix M is the (m×n) s-box.

According to a yet further embodiment, the above process can be simplified more by measuring not all Hamming distances, but the Hamming distances of subsets of three vectors among already chosen candidate vectors. In other words, step (d') above can be replaced by (d").

(d") Continue the above process with fourth, fifth, etc., bent vectors until 32 bent vectors are selected (at each step checking that all possible Hamming distances among all subsets of three vectors are over the threshold).

As a specific example, to choose the fifth vector, measure the Hamming distances among the fifth and all possible two out of four chosen vectors, e.g. the distance among first, second, and fifth; first, third and fifth; first, fourth and fifth; second, third and fifth; second, fourth and fifth; third, fourth and fifth. If all the distances are over the threshold, retain the fifth vector.

FIGS. 6 and 7 show two sample s-boxes designed as above. The s-boxes are arranged in columns and rows and shown in hexadecimal numbers instead of binary numbers for ease of inspection. The figures are to be understood as follows: row one, column one is the first s-box entry; row one, column two the second s-box entry; row two, column one the ninth s-box entry; and row 32, column 8 the 256th s-box entry.

The s-box designed as above has the following characteristics:

it provides good "confusion" because each row has approximately half zeros and half ones;

it provides good avalanche because the sum (modulo 2) of any pair of rows has approximately half zeros and half ones; and each output bit will respond ideally to changes in the input vector because of the use of bent vectors as the matrix columns.

Furthermore, the use of bent functions which are nonlinearly related guarantees "ideal" behavior from any s-box, that is to say, any change in the m input bits (from single-bit, to multi-bit, to total complementation) causes each of the n output bits to change with probability ½, virtually independently of all the other output bits. Therefore, on average, approximately half the output bits will change and because the s-box outputs are summed modulo 2, this means that approximately half the bits in the modified half data block (message half) will be inverted. This remains true regardless of how many s-boxes have their inputs modified (since randomly changing approximately half the bits in any nonzero set of binary vectors randomly changes approximately half the bits in their modulo 2 sum). It should also be noted that this design eliminates the need for permutation layers. In other known systems, permutations are essential because s-boxes are small relative to the size of the half data block (message half) and permutations serve to spread the avalanche from a single s-box over the half data block so that these changes are input to several s-boxes in the next round. In the present system, each s-box affects the entire message half directly and so changes are guaranteed to affect many s-boxes in the next round without a permutation layer.

B) Key Scheduling

Keying is a crucial aspect of cryptosystem design. A key schedule is required that provides some guarantee of key/ciphertext Strict Avalanche Criterion (SAC) and Bit Independence Criterion (BIC). That is, each ciphertext bit should depend in a complicated, nonlinear way on every key bit and any change in the key should cause each ciphertext bit to change with probability one half, virtually independently of the other ciphertext bits. On the other hand, it is preferable from an implementation standpoint that the key schedule is as simple as possible. In the invention, the keysize is equal to the blocksize of 2n bits. At each round, as described earlier, s*m bits of key are taken and used as the inputs to s (m×n) s-boxes. The s (m×n) s-boxes produce s n-bit outputs which are summed modulo 2 with the n-bit half data block. Because of the properties of the s-boxes, any changes to the key bits at any round will randomly change approximately half the bits in the modified half data block at that round. It should be noted that the s s-boxes used for keying should be from separate compatibility classes and, furthermore, should be in separate classes from the other r s-boxes used in half data block modification (so that there is no guaranteed cancellation of s-box outputs). A compatibility relation on a set is a relation which has reflexive and symmetric properties. Two s-boxes are said to be in the same compatibility class if they have one or more Boolean functions in common, or if a Boolean function in one is a linear modification of a Boolean function in the other (its bitwise complement, for example). It is also required that the s*m key bits selected in round i should be different from the s*m key bits selected in round i+1 because it is known that DES-like cryptosystems without a rotating key can be broken. Another requirement is that if any key bit is used in the last round for the first time, then the network fails the key/ciphertext completeness test since complementing that bit can only affect a single half data block. All key bits must therefore be used by the second last round at the latest.

In the present embodiment, KEY (initial key)= k1k2k3k4k5k6k7k8 where ki is the i-th byte of the KEY. The key schedule can then be:

| Internal key at round i | Bytes of key (8 bytes) |
|---|---|
| $K_1$ | k1, k2 |
| $K_2$ | k3, k4 |
| $K_3$ | k5, k6 |
| $K_4$ | k7, k8 |
| $K_5$ | k4', k3' |
| $K_6$ | k2', k1' |
| $K_7$ | k8', k7' |
| $K_8$ | k6', k5' |

KEY is transformed to KEY'=k1'k2'k3'k4'k5'k6'k7'k8' between round 4 and round 5. The transformation is defined by:

$$(k1'k2'k3'k4')=(k1k2k3k4) +S5[k5]+S6[k7]$$

$$(k5'k6'k7'k8')=(k5k6k7k8) +S5[k2']+S6[k4'].$$

The bytes of KEY' are then used to construct the remaining four internal keys as shown above.

This key schedule has some features worth noting. Firstly, each key byte exerts its influence twice, once in the first four rounds and once in the last four rounds. Secondly, each key byte is used once to influence s-box S5 and once to influence s-box S6. Thirdly, no key bytes are used in two consecutive rounds. Fourthly, the key bytes in the last four rounds are not the reverse order of the key bytes in the first four rounds (which may have facilitated some sort of "meet-in-the-middle" attack). Finally, it is clear from FIG. 4 that the left half of the initial plaintext is modified by $f_1$, $f_3$, $f_5$, and $f_7$ and the right half is modified by $f_2$, $f_4$, $f_6$, and $f_8$. The key schedule is such that every key byte is used to influence $f_i$, i odd, and every key byte is used to influence $f_i$, i even. As seen in the above description and in FIG. 5, one of the differences between the invention and prior art is the dependence upon s-boxes for the creation of the internal keys and modified internal keys for each round. Other key schedules typically use a complex bit-selection algorithm to select the bits of the internal key for round i from the initial key. However, it has been shown that any weakness in this bit selection algorithm can lead to simple cryptanalysis of the cipher, regardless of the number of rounds. The schedule of the invention uses a very simple bit-selection algorithm and a set of key schedule s-boxes to create the internal keys and modified internal keys for the transformation round.

A key is weak if it is its own inverse and semi-weak if it is not weak but its inverse is easily found. If an encryption of a plaintext under a key H produces an identical text which a decryption of the same plaintext under a key K produces, key H is an inverse of key K. It can be shown that, due to the fact that s-boxes are employed in the schedule itself (i.e. in the generation of the internal keys and modified internal keys), the encryption system using the present key scheduling mechanism has no weak keys and no semi-weak keys.

It should also be noted that the invention is immune to related-key cryptanalysis because there are no related keys in the present key schedule, that is to say, the derivation algorithm of the internal keys from the previous internal keys is not the same in all rounds due to the use of a transformation step. Encryptions using this key schedule are not vulnerable to the "chosen-key-chosen-plaintext", "chosen-key-known-plaintext" or "chosen-plaintext-related-keys" attacks. Furthermore, the invention has no known complementation properties and so appears not to be vulnerable to reduced key searches based on this type of weakness.

In other embodiments, smaller keysizes are used, e.g. 5, 6 or 7 bytes. These input keys may be expanded to 8 bytes by padding with zero bytes without sacrificing any of the key schedule properties listed above.

In a yet another embodiment where 12 rounds are performed, the key schedule may be extended as follows:

| Internal key at round i | Bytes of key (8 bytes) |
| --- | --- |
| $K_9$ | k1", k4" |
| $K_{10}$ | k3", k2" |
| $K_{11}$ | k5", k8" |
| $K_{12}$ | k7", k6" |

In this case, between the eighth and ninth rounds the following KEY transformation is performed:

$$(k1"k2"k3"k4")=(k1'k2'k3'k4')\oplus S5[k5']\oplus S6[k7']$$

$$(k5"k6"k7"k8")=(k5'k6'k7'k8')\oplus S5[k2"]\oplus S6[k4"].$$

For initial keys of 5, 6, or 7 bytes, the expansion to 8 bytes is accomplished as above.

It should, of course, be mentioned that in further practical embodiments, it is more efficient to separate steps of generating modified internal keys from the remaining part of the round function process. Therefore the modified internal keys for rounds can be created ahead of time so that all modified internal keys are ready when a data block arrives for encryption.

There are many modifications which can be made to embodiments so far described to alter the level of security of the network if desired. For example, a longer key can be used in which extra key bytes go into extra s-boxes or are otherwise used in the key schedule. Alternatively, the blocksize can be changed to other desired values, or the number of rounds can be changed in the network to vary encryption/decryption speed.

What is claimed is:

1. In a data encryption method of cryptographically transforming plaintext into ciphertext in data blocks of a predetermined bitlength comprising a plurality of consecutive transformation rounds of half of each data block, each consecutive transformation round comprising steps of:

selecting an internal key of a specific bit combination from key bits;

processing the internal key by a (m×n) substitution box to generate a modified internal key, where m and n are positive even integers, m<<n, and $$m < \log\binom{n}{n/2};$$

XORing half of each data block with the modified internal key to generate a first modified half data block;

processing the first modified half data block by a plurality of (m×n) mutually different substitution boxes to generate a second modified half data block; and XORing the second modified half data block with the remaining half of the data block to generate a transformed half data block of a transformation round.

2. The data encryption method of cryptographically transforming plaintext into ciphertext in data blocks of a predetermined bitlength according to claim 1, wherein each of the s-boxes is a partially bent-function-based s-box.

3. The data encryption method of cryptographically transforming plaintext into ciphertext in data blocks of a predetermined bitlength according to claim 2, wherein the consecutive transformation rounds are even in number and performed in a sequence in which the transformed half data block of one round is used as input for the next round of transformation.

4. The data encryption method of cryptographically transforming plaintext into ciphertext in data blocks of a predetermined bitlength according to claim 3, wherein after a predetermined even number of transformation rounds, the transformed half data block of the final transformation round is concatenated with the remaining half of the data block to generate the ciphertext.

5. In a data encryption method of cryptographically transforming plaintext into ciphertext in data blocks, each data block containing 2n bits, n being a positive even integer, comprising a plurality of consecutive transformation rounds, each consecutive transformation round comprising steps of:

selecting an internal key of a specific bit combination and of s*m bits long from key bits, s being a positive integer and m being positive even integer;

processing the internal key by s (m×n) mutually different substitution boxes to generate a modified internal key, where m<<n, and $$m < \log\binom{n}{n/2};$$

XORing half of each data block with the modified internal key to generate a first modified half data block;

dividing the first modified half data block into r parts, r being a positive integer; and processing each part of the first modified half data block by each of r (m×n) mutually different substitution boxes to generate a second modified half data block; and XORing the second modified half data block with the remaining half of the data block to generate a transformed half data block of a transformation round.

6. The data encryption method of cryptographically transforming plaintext into ciphertext in data blocks of a predetermined bitlength according to claim 5, wherein the consecutive transformation rounds are even in number and performed in a sequence in which the transformed half data block of one round is used as input for the next round of transformation.

7. The data encryption method of cryptographically transforming plaintext into ciphertext in data blocks of a predetermined bit length according to claim 6, wherein after a predetermined even number of transformation rounds, the transformed half data block of the final transformation round is concatenated with the remaining half of the data block to generate the ciphertext.

8. The data encryption method of cryptographically transforming plaintext into ciphertext in data blocks according to claim 7, wherein each data block contains 64 bits, the s-boxes are six partially bent-function-based 8×32 s-boxes, S1, S2, S3, S4, S5, and S6, and the key bits comprises a key pattern of 8 bytes in the following order k1, k2, k3, k4, k5, k6, k7, k8 in that two bytes are selected as the internal key for each round according to the following schedule:

| Internal key at round i | Bytes of the key |
| --- | --- |
| K1 | k1, k2 |
| K2 | k3, k4 |
| K3 | k5, k6 |
| K4 | k7, k8 |
| K5 | k4', k3' |
| K6 | k2', k1' |
| K7 | k8', k7' |
| K8 | k6', k5' | wherein between round 4 and round 5 the key bits are transformed by the following transformations:

$$(k1'k2'k3'k4')=(k1k2k3k4) \oplus S5[k5] \oplus S6[k7]$$

$$(k5'k6'k7'k8')=(k5k6k7k8) \oplus S5[k2'] \oplus S6[k4']$$

where $S5[k5]$, $S6[k7]$, $S5[k2']$, $S6[k4']$ are processing by S5 and S6.

9. A data encryption method of cryptographically transforming plaintext into ciphertext in data blocks according to claim 8 wherein additional rounds are performed using the following internal keys for each round:

| K9 | k1", k4" |
| --- | --- |
| K10 | k3", k2" |
| K11 | k5", k8" |
| K12 | k7", k6" | wherein between round 8 and round 9 the key bits are transformed by the following transformations:

$$(k1"k2"k3"k4")=(k1'k2'k3'k4') \oplus S5[k5'] \oplus S6[k7']$$

$$(k5"k6"k7"k8")=(k5'k6'k7'k8') \oplus S5[k2"] \oplus S6[k4"].$$

10. A data encryption method of cryptographically transforming plaintext into ciphertext in data blocks according to claim 1 wherein the steps of selecting an internal key and processing the internal key to generate a modified internal key are performed for all the consecutive transformation rounds before the step of XORing a half of each data block in the first transformation round.

11. A data encryption method of cryptographically transforming plaintext into ciphertext in data blocks according to claim 9 wherein all the internal keys for all the transformation rounds are generated before the first transformation round is performed.

12. A data encryption system for cryptographically transforming plaintext into ciphertext in data blocks of a predetermined bitlength by performing a plurality of consecutive transformation rounds of half of each data block, comprising a plurality of partially bent-function-based (m×n) s-boxes where m and n are positive even integers, m<<n, $$m < \log \binom{n}{n/2},$$

each (m×n) s-box being a $2^m \times n$ binary matrix which contains n binary bent vectors of length $2^m$ and at least one non-zero linear combination of the vectors which is not bent;

a key processor for processing an internal key by at least one of the s-boxes to generate a modified internal key;

a data processor for processing each half data block by at least one of the s-boxes; and an XOR gate for XORing the modified internal key and the processed half data block to generate a transformed half data block of the transformation round.

13. The data encryption system for cryptographically transforming plaintext into ciphertext in data blocks of a predetermined bitlength according to claim 12 further comprising a first plurality of partially bent-function-based (m×n) s-boxes for processing an internal key to generate a modified internal key and a second plurality of partially bent-function-based (m×n) s-boxes for processing the half data block and the modified internal key.

14. The data encryption system for cryptographically transforming plaintext into ciphertext in data blocks of a predetermined bitlength according to claim 13 wherein the first plurality of s-boxes comprises two partially bent-function-based 8×32 s-boxes and the second comprises four partially bent-function-based 8×32 s-boxes.

15. The data encryption system for cryptographically transforming plaintext into ciphertext in data blocks of a predetermined bitlength according to claim 13, further comprising a key scheduling mechanism arrangement for selecting internal keys in a specific bit combination from key bits, one internal key for one transformation round.

16. The data encryption system for cryptographically transforming plaintext into ciphertext in data blocks of a predetermined bitlength according to claim 14 wherein each of the s-boxes has 32 binary bent vectors of length $2^8$, all the Hamming distances among the bent vectors being greater than a predetermined value.

* * * * *